US006061700A

United States Patent [19]
Brobst et al.

[11] Patent Number: 6,061,700
[45] Date of Patent: May 9, 2000

[54] APPARATUS AND METHOD FOR FORMATTING A WEB PAGE

[75] Inventors: Curtis Howard Brobst; Paul Brian Monday, both of Rochester, Minn.

[73] Assignee: International Business Machines Corporation, Armonk, N.Y.

[21] Appl. No.: 08/907,606

[22] Filed: Aug. 8, 1997

[51] Int. Cl.⁷ .................................................. G06F 17/00
[52] U.S. Cl. .......................... 707/517; 707/101; 707/523; 707/526
[58] Field of Search ................. 707/1–540; 345/156–352

[56] References Cited

U.S. PATENT DOCUMENTS

| | | | |
|---|---|---|---|
| 5,319,748 | 6/1994 | Motoyama | 395/162 |
| 5,495,565 | 2/1996 | Millard et al. | 395/147 |
| 5,909,207 | 6/1999 | Ho | 345/156 |
| 5,909,570 | 6/1999 | Webber | 707/4 |
| 5,913,214 | 6/1999 | Madnick | 707/10 |
| 5,917,491 | 6/1999 | Bauersfeld | 345/352 |

*Primary Examiner*—Thomas G. Black
*Assistant Examiner*—David Jung
*Attorney, Agent, or Firm*—Martin & Associates, LLC; Derek P. Martin

[57] ABSTRACT

An apparatus and method for formatting a specified group of related web pages into a single web page allows a user to define a number of selected pages and associated relation criteria for each selected page. A formatting mechanism collects the URLs for the selected pages and those related pages based on the relation criteria and stores the URLs in a URL container. The formatting mechanism further invokes each web page associated to the URLs contained in the URL container and generates a conglomerate page. The conglomerate web page may include data insert into or referenced in one or more of the selected pages. The conglomerate web page may then be printed using a standard browser print function.

37 Claims, 8 Drawing Sheets

Recursive Method Collect URLs (URL_List, URL Container, dig) — 700 for each URL — 710
        add the URL to URL container — 712
        invoke page corresponding to URL — 714
        collect URLs referenced in page — 716
    if (dig>0) — 720
        for each URL collected, collect — 722
        URLs (this collected URL, URL container, dig-1) — 724 end

FIG. 7

800 for each URL in URL container — 810 invoke page corresponding to URL — 820
    collect URLs referenced in page — 830
    for each URL collected — 840 if URL references URL in URL container — 842 if first occurrence of URL in URL container — 844 mark as target — 846 else modify HREF text to "See Section ____ " — 848
                where ____ is the text from target HREF else modify HREF text to "Section Not Included" — 850 end end

FIG. 8

APPARATUS AND METHOD FOR FORMATTING A WEB PAGE

FIELD OF THE INVENTION

This invention generally relates to computer networks, such as the Internet. More specifically, this invention relates to an apparatus and method for formatting web pages.

BACKGROUND OF THE INVENTION

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other. In this manner, a large number of people within a company could communicate at the same time with a software application running on one computer system.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC (i.e., workstation) that wishes to access the Internet typically does so using a software application known as a web browser. A web browser makes a connection via the Internet to other computers known as web servers, and receives information from the web servers that is displayed on the user's workstation. Information transmitted from the web server to the web browser is generally formatted using a specialized language called Hypertext Markup Language (HTML) and is typically organized into pages known as web pages. Many web pages include one or more special reference locations known as "links" that invoke other web pages. Links allow a web user to easily navigate to other web sites of interest by clicking on the appropriate link with a mouse or other pointing device.

Often a web user will want to print a web page being currently viewed. Web browsers typically have a print function that allows a user to print the current page. However, as the complexity of web sites increases, it becomes increasingly difficult to locate needed information, and the process of printing several related web pages becomes a tedious exercise that involves: invoking the web page, printing the web page, invoking the next web page, printing, invoking, printing, etc. In other words, prior art browsers require a user to invoke a page before printing it. With these prior art browsers, if a user needs to print 40 related web pages, the user must manually invoke and print each of the 40 web pages. Needless to say, this process becomes very time-consuming.

As the number of Internet users, providers, and web servers continues to rapidly expand, it will become increasingly important for a web user to be able to print related web pages without manually invoking and printing each page. Without improvements in the manner web pages are printed, the printing of web pages will continue to be an impediment to the effective usage of resources available on the Internet.

SUMMARY OF THE INVENTION

According to the present invention, an apparatus and method for formatting a specified group of related web pages into a single web page is disclosed. A user defines a number of selected pages and associated relation criteria for each selected page. A formatting mechanism collects the URLs for the selected pages and those related pages based on the relation criteria and stores the URLs in a URL container. The formatting mechanism further invokes each web page associated to the URLs contained in the URL container and generates a conglomerate page. The conglomerate web page may include data insert into or referenced in one or more of the selected pages. The conglomerate web page may then be printed using a standard browser print function.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and:

FIG. 7 is a pseudo-code representation of the recursive method of collecting the selected and related web pages in accordance with the preferred embodiment;

FIG. 8 is a pseudo-code representation of the processing method of the URL container in accordance with the preferred embodiment.

DETAILED DESCRIPTION OF THE PREFERRED EMBODIMENT

Overview

The method and apparatus of the present invention has particular applicability to formatting web pages on the Internet. For those individuals who are not familiar with the Internet, a brief overview of relevant Internet concepts is presented here.

Figure 2:
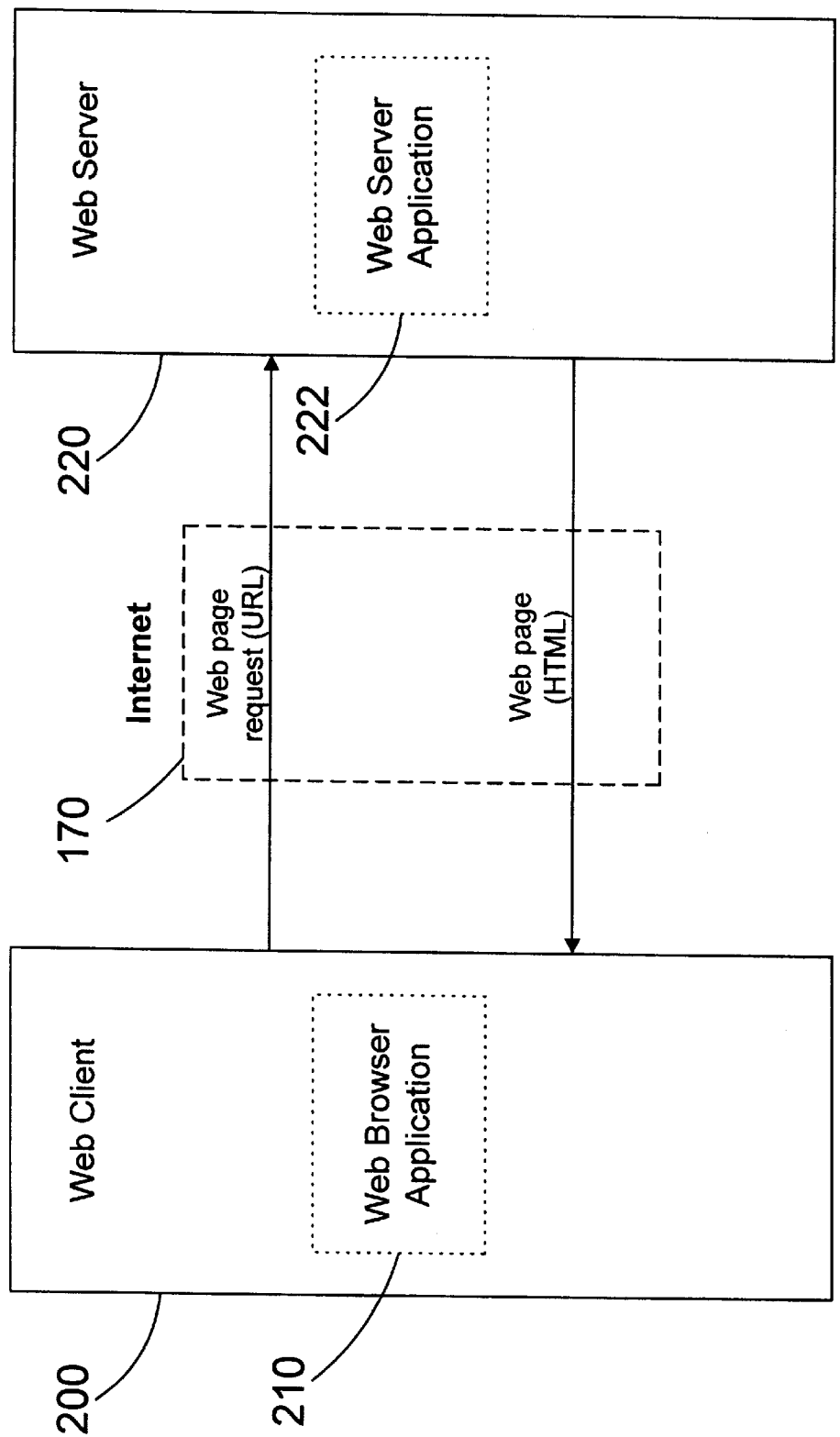
FIG. 2 is a block diagram of a typical Internet connection.

An example of a typical Internet connection is shown in FIG. 2. A user that wishes to access information on the Internet 170 typically has a computer workstation 200 that executes an application program known as a web browser 210. Under the control of web browser 210, workstation 200 sends a request for a web page over the Internet 170. Web page data can be in the form of text, graphics and other forms of information, collectively known as MIME data. Each web server on the Internet has a known address, termed the Uniform Resource Locator (URL), which the web browser uses to connect to the appropriate web server. Because web server 220 can contain more than one web page, the user will also specify in the address which particular web page he wants to view on web server 220. A web server computer system 220 executes a web server application 222, monitors requests, and services requests for which it has responsibility. When a request specifies web server 220, web server application 222 generally accesses a web page corresponding to the specific request, and transmits the page to the user's workstation 200.

Web Pages

A web page may contain various types of MIME data. Most web pages include visual data that is intended to be displayed on the monitor of user workstation 200. Web pages are generally written in Hypertext Markup Language (HTML). When web server 220 receives a web page request, it will send the requested page in HTML form across the Internet 170 to the requesting web browser 210. Web browser 210 understands HTML and interprets it and outputs the web page to the monitor of user workstation 200. This web page displayed on the user's screen may contain any suitable MIME data, including text, graphics, and links (which reference addresses of other web pages). These other web pages (i.e., those represented by links) may be on the same or on different web servers. The user can invoke these other web pages by clicking on these links using a mouse or other pointing device. This entire system of web pages with links to other web pages on other servers across the world is known as the "World Wide Web".

The remainder of this specification describes how the present invention improves the convenience of formatting and printing related web pages by providing ways that a user may format and print related web pages without the customary user interaction required to invoke and print each web page. Those skilled in the art will appreciate that the present invention applies equally to the formatting and/or printing of any related data, whether the data be in the form of web pages, database records, or other data that may be interrelated.

DETAILED DESCRIPTION

Figure 1:
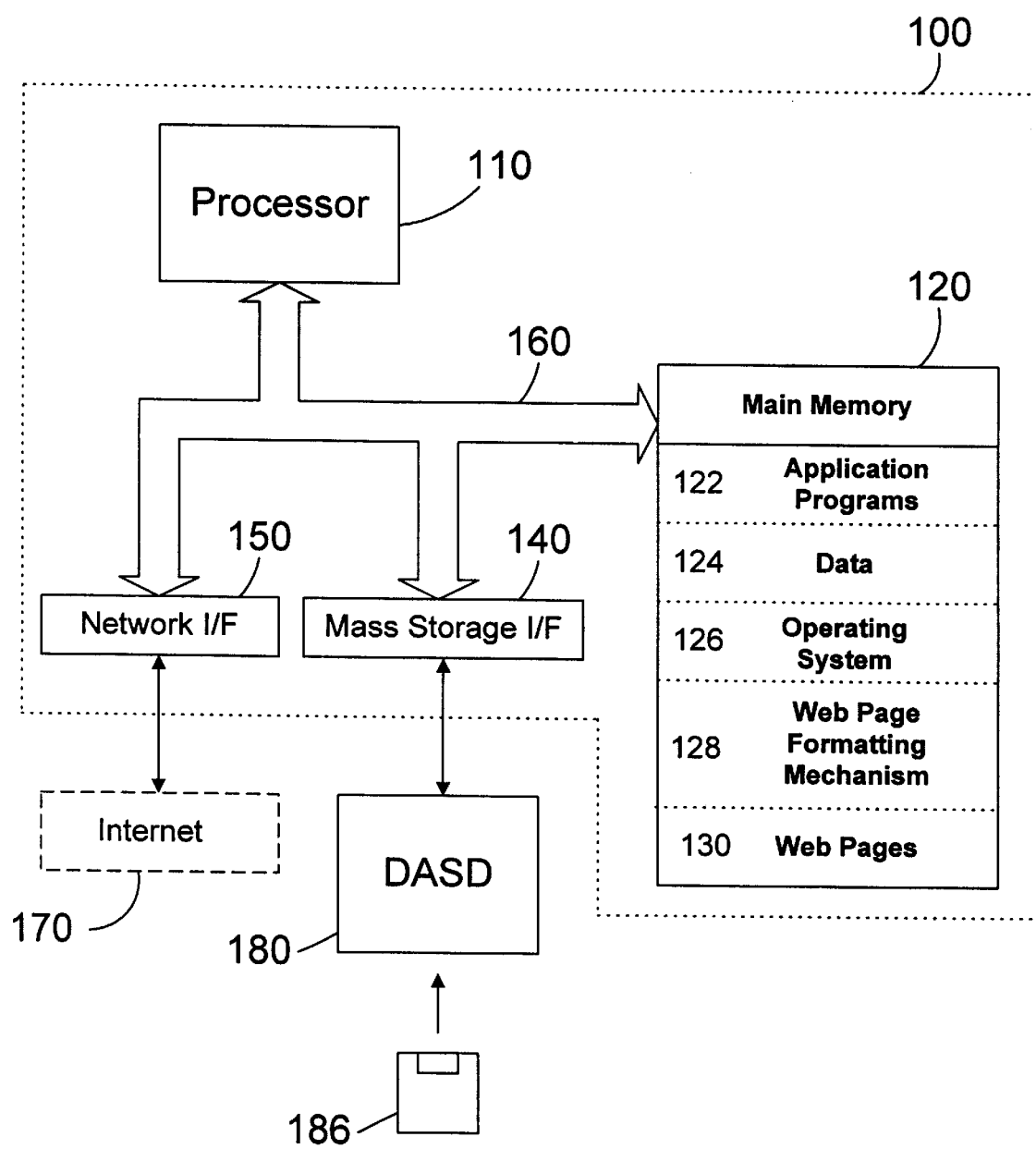
FIG. 1 is a block diagram of a computer system in accordance with the present invention.

Referring to FIG. 1, a computer system 100 in accordance with the present invention includes a processor 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of possible additions include: a computer monitor, a keyboard, a cache memory, and peripheral devices such as printers.

Processor 110 can be constructed from one or more microprocessors and/or integrated circuits. Processor 110 executes program instructions stored in main memory 120. Main memory 120 stores programs and data that the computer may access. When computer system 100 starts up, processor 110 initially executes the program instructions that make up operating system 126. Operating system 126 is a sophisticated program that manages the resources of the computer system 100. Some of these resources are the processor 110, main memory 120, mass storage interface 140, network interface 150, and system bus 160.

Main memory 120 includes one or more application programs 122, data 124, operating system 126, a web page formatting mechanism 128, and one or more web pages 130. Application programs 122 are executed by processor 110 under the control of operating system 126. Application programs 122 can be run with program data 124 as input. Application programs 122 can also output their results as program data 124 in main memory. In the present invention, a computer system 100 includes a web page formatting mechanism 128 that allows multiple related web pages to be formatted into a single page, which may then be printed, downloaded to disk, placed on the Internet or put to any other use known by one skilled in the art.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is usually placed in main memory 120 where processor 110 can process it.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 185). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100. In addition, an apparatus in accordance with the present invention includes any possible configuration of hardware and software that contains the elements of the invention, whether the apparatus is a single computer system or is comprised of multiple computer systems operating in concert.

Network interface 150 allows computer system 100 to send and receive data to and from any network the computer system may be connected to. This network may be a local area network (LAN), a wide area network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main processor and a single system bus, those skilled in the art will appreciate that the present invention may be practiced using a computer system that has multiple processors and/or multiple buses. In addition, the interfaces that are used in the preferred embodiment may include separate, fully programmed microprocessors that are used to off-load compute-intensive processing from processor 110, or may include I/O adapters to perform similar functions.

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 186 of FIG. 1) and CD ROM, and transmission type media such as digital and analog communications links.

The remainder of this specification will describe the preferred embodiments for the web page formatting mechanism 128 which takes a number of selected web pages, collects the URLs, and creates a single document which may be termed a conglomerate or flattened web page. The term "flattened web page" is used herein to convey with imagery that several related pates in a typical cross-linked tree-like hierarchy are all assembled or "flattened" into a single page, thereby removing cross-links and placing the various pages in sequential order.

Figure 3:
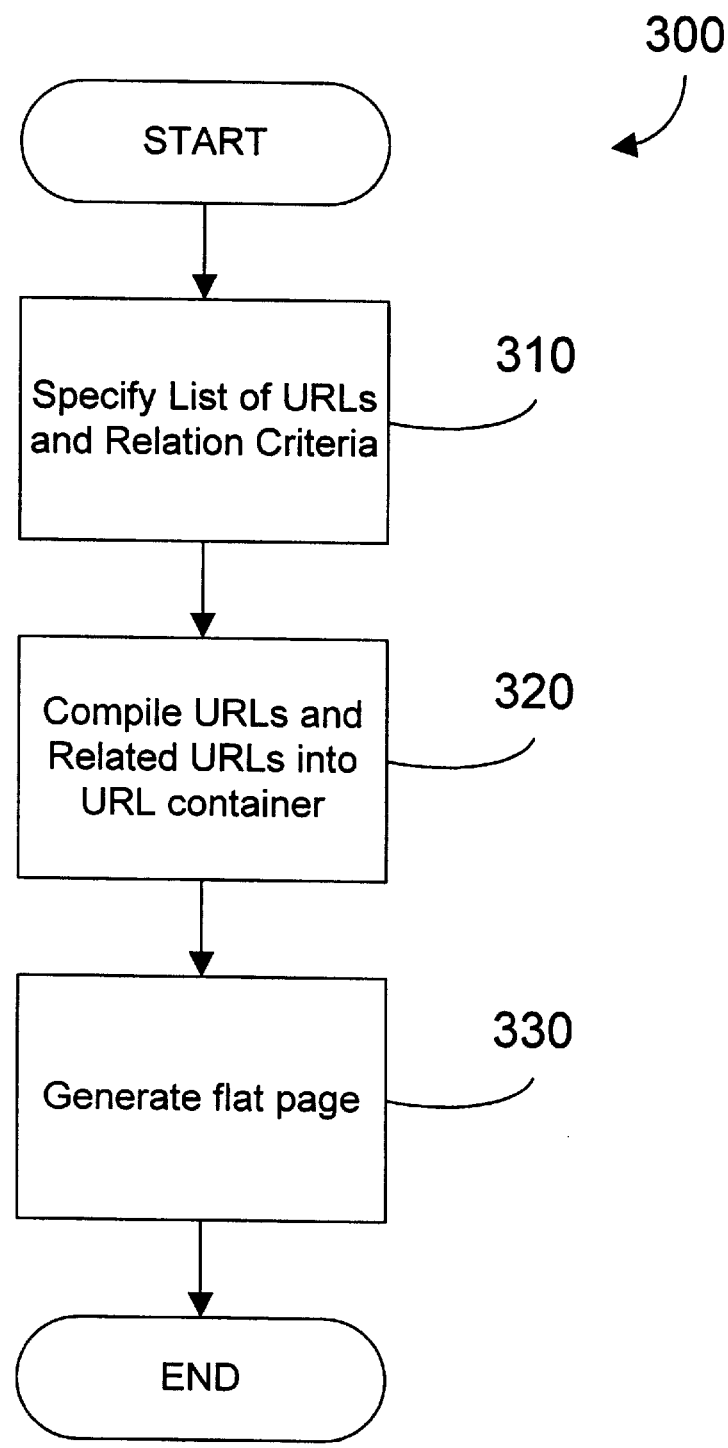
FIG. 3 is a flow diagram of the method steps for formatting selected and related web pages in accordance with the preferred embodiment.

Referring now to FIG. 3, method 300 for formatting a web page starts by the user defining a list of URLs and a relation criteria for each selected URL (step 310). This may be achieved in many different ways; mechanically through inputs from a human user into a menu screen, by retrieving a list of URLs from a web browsers historic memory, or any other method known by one skilled in the art to specify URL data. Once the list of URLs and the relation criteria for each URL are defined, a URL container is created with all the selected and related URLs (step 320). Finally, a flat page is generated from the selected and related URLs within the flat container (step 330).

The relation criteria is an important element in the formatting process because it defines the requisite association that must exist between a number of URLs to be deemed "related" URLs and therefore defines which pages to include in the flattened page. The criteria for whether or not two URLs are "related" may vary within the scope of the invention. One specific relation criteria is referred to herein as "nesting levels", and is explained with reference to FIG. 4.

Figure 4:
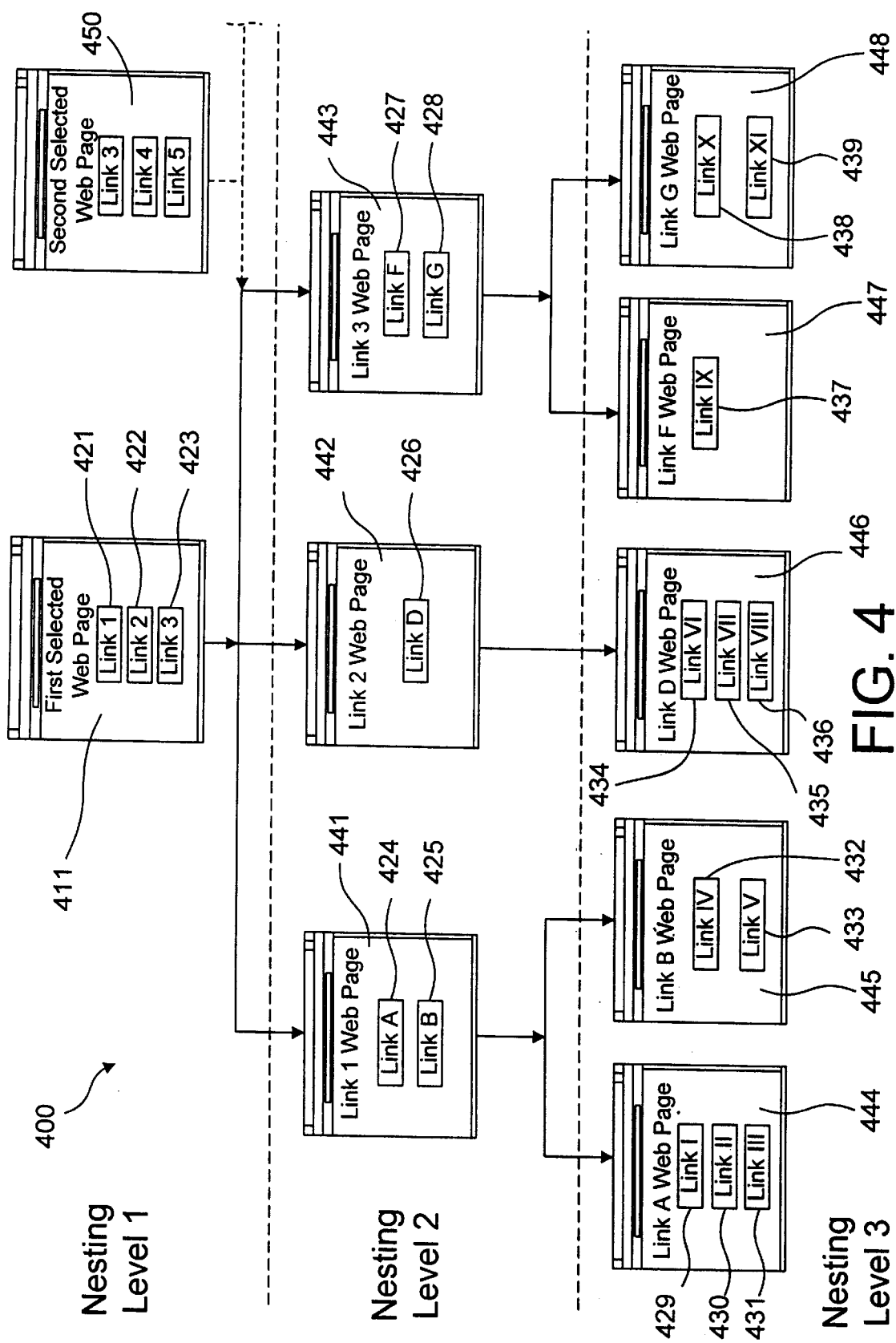
FIG. 4 is a block diagram of the nesting structure used as the relation criteria in accordance with the preferred embodiment.

Pages with links to each other may be arranged in a tree-like structure 400 as shown in FIG. 4. Nesting structure 400 has at least one selected web page 411 (e.g., first selected web page 411 and/or second selected web page 450) with a number of links 421–439 (i.e., Link 1, Link 2, Link 3) to other pages 441–448. The links each comprise a mechanism to invoke a web page, such as a URL, which may be activated by the user. When a user defines the nesting level, they are determining the depth into the nesting tree 400 which the formatting mechanism reaches to find related URLs. For example, if a user chooses first selected web page 411 as their selected page and defines a relation criteria of two nesting levels to collect the related URLs, the related URLs comprise the URLs for the first selected web page 411 and the URLs for all the links contained in those web pages that are directly linked to the first selected web page, namely: the URLs for first selected web page 411, Link 1 web page 441, Link 2 web page 442, Link 3 web page 443, Link A web page 444, Link B web page 445, Link D web page 446, Link F web page 447 and Link G web page 448. If the nesting level was set to three then the related URLs would include those defined for the two nesting level case and would additionally include the URLs for Link I 429, Link II 430, Link III 431, Link IV 432, Link V 433, Link VI 434, Link VII 435, Link VIII 436, Link IX 437, Link X 438 and Link XI 439.

Other suitable relation criteria for relating URLs include: whether or not the URLs are on the same web server; whether a specific search word appears in the web URLs search list; whether there is a link between the URLs; or whether the URLs have the same base address.

An example of base address relation criteria follows. A home page may have the address www.corporationX.com/home.html, and any URLs that have the base address www.corporationX.com are related to the home page. In another example, a URL at address www.corporationX.com/support/index.html is selected, and any URLs that share the base address www.corporationX.com/support are related to the selected URL, while other URLs at this site are not related. Regardless of the specific relation criteria used, URLs that are related are formatted into a single web page, as discussed in more detail below.

Figure 5:
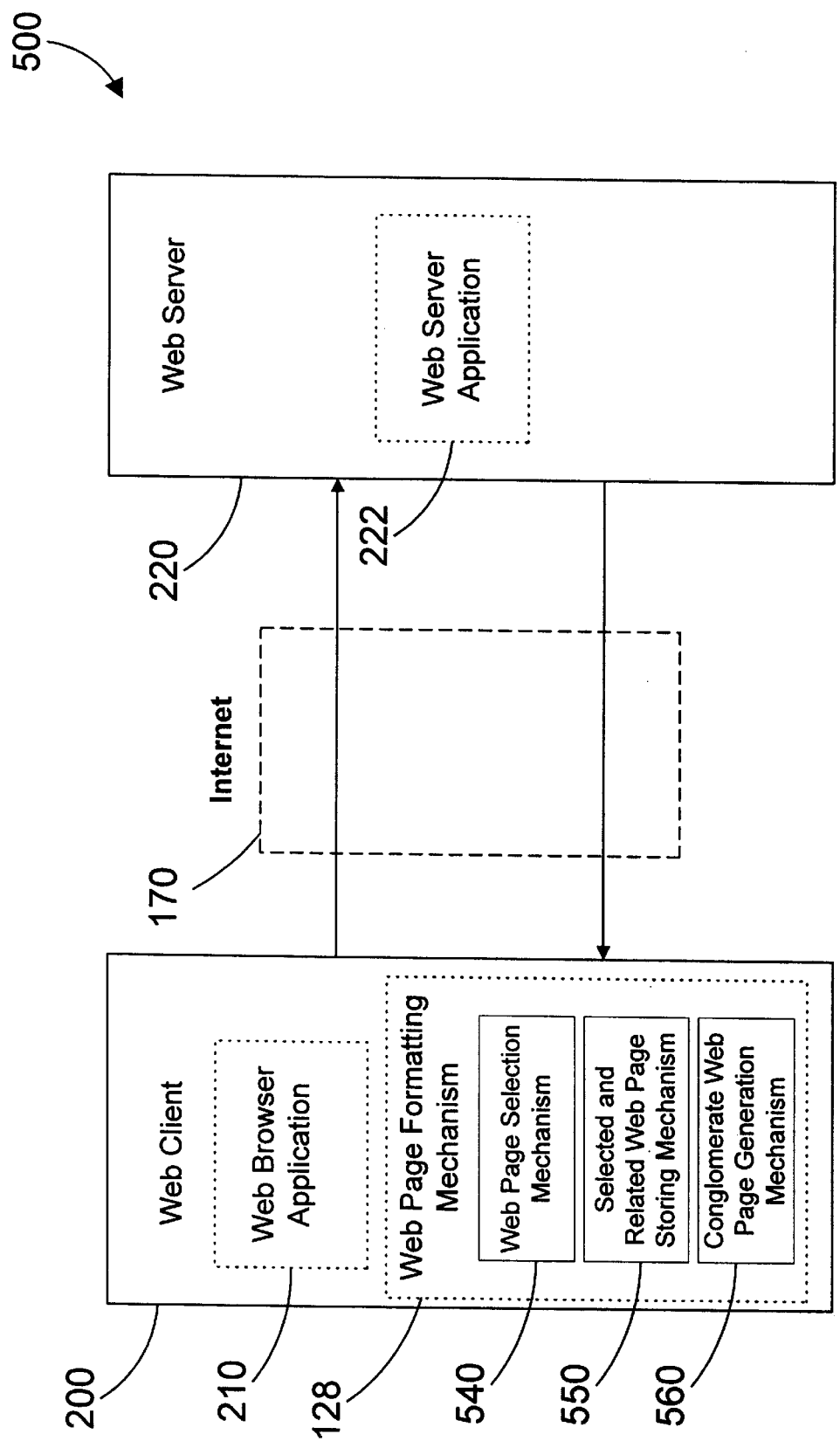
FIG. 5 is a block diagram of a computer system that allows formatting of selected and related web pages in accordance with the preferred embodiment.
Figure 6:
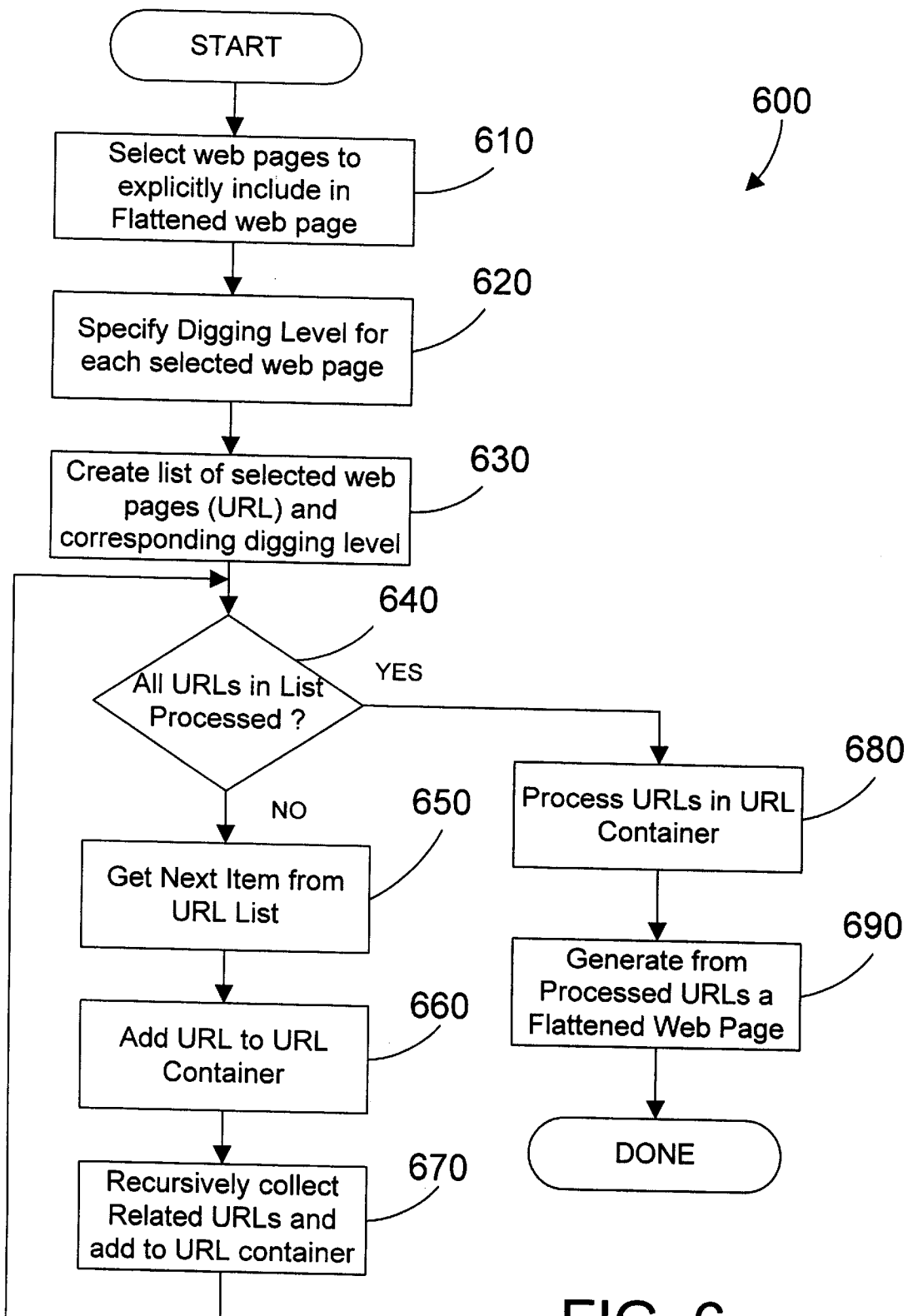
FIG. 6 is a flow diagram of the method steps for collecting and formatting the selected and related web pages in accordance with the preferred embodiment.

A better understanding of the above described steps may be obtained through the following example of the preferred embodiment. Referring now to FIGS. 5–6, apparatus 500 in accordance with the preferred embodiment, for use with the Internet, includes a web client 200 and a web server 220 connected via the Internet 170. Web client 200 includes a web browser application 210 and a web page formatting mechanism 128. The web browser application 210 is a standard web browser known in the art. Web page formatting mechanism 128 includes a web page selection mechanism 540, web page storing mechanism 550, and web page conglomeration mechanism 560. While web page formatting mechanism 128 is shown in FIG. 5 as being separate from web browser 210, in the best mode of the invention it is contemplated that web page formatting mechanism 128 will be integrated into a web browser application, thereby providing a browser with advanced formatting capabilities for related web pages, such as printing, downloading, document transfers, etc. In the alternative, web page formatting mechanism 128 may be a separate application running on web client 200, or may be a plug-in or Java applet/application for web browser application 210. The functions of web page formatting mechanism 128 are described herein without regard to whether mechanism 128 resides within web browser application 210 or outside of web browser application 210.

Web page selection mechanism 540 is used to create a list of user selected and related web pages. Web page storing mechanism 550 stores the list of selected and related web pages in a URL format. Conglomeration mechanism 560 takes the selected URLs and formats them into a flattened web page. Because apparatus 500 flattens many lined web pages into a single conglomerate web page, the standard print function supplied with any browser will print the conglomerate web page. The function of mechanisms 540–560 may best be understood with relation to the flow diagram of FIG. 6.

A method 600 for formatting multiple related web pages or URLs begins by selecting the web pages or URLs which are to be explicitly included in the flattened web page (step 610). Once the web pages have been selected, a digging level is specified for each selected web page (step 620). The digging level is a specific example of a suitable relation criteria, that is equivalent to the nesting level discussed with reference to FIG. 4. When all the web pages and their digging levels have been defined, a URL list of the web pages and the associated digging level is created (step 630). This list is then in a format which may be used to fill a URL container. The list is processed beginning with step 640. If the URL list is not empty (step 640=NO), the next URL in the list is retrieved (step 650). This selected URL is then added to the URL container in preparation for processing (step 660). All URLs related to the selected URL are then recursively collected by following the related URLs down through the nesting structure 400 to the requisite digging level and adding the URLs to the URL container for processing (step 670). Steps 650, 660 and 670 continue until all URLs in the URL list are processed (step 640=YES). Once all URLs in the URL list are processed (step 640=YES), the URLs in the URL container are processed by invoking each of the URLs and collecting the web pages (step 680). The mechanisms and interplay between web client and web server to invoke a web page are well-known in the art. Once the web pages have been invoked, a flattened web page is generated from the invoked web pages (step 690), preferably by appending the related web pages together in a single web page. The flattened (i.e., conglomerate) web page is in a form which may be downloaded to disk, transferred to other Internet users, locally sent to other network users, printed or used as known to one skilled in the art.

Figure 9:
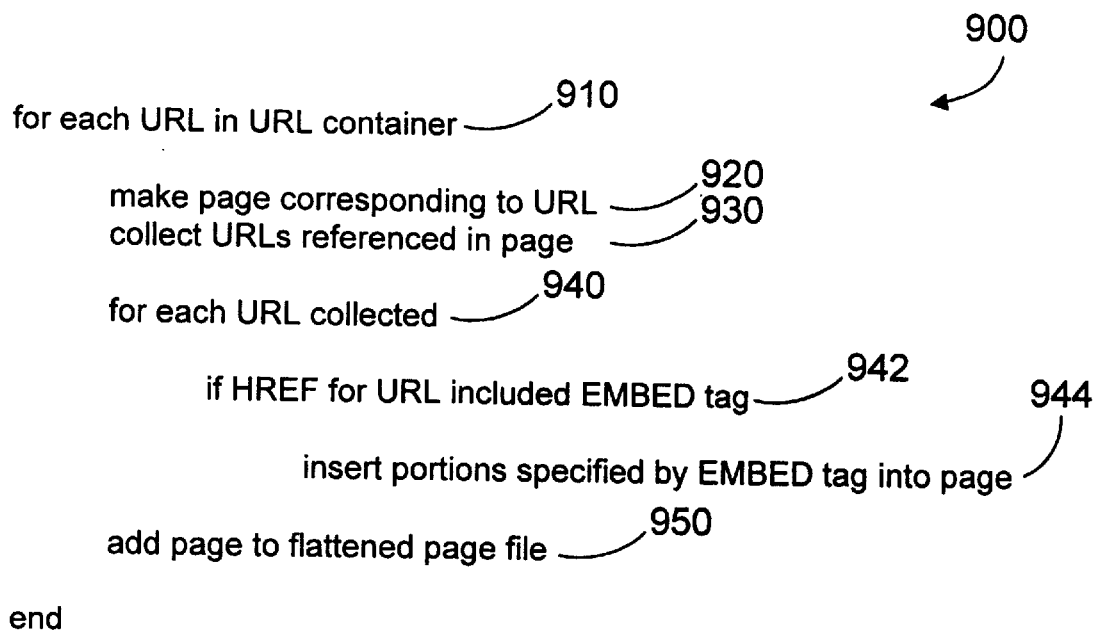
FIG. 9 is a pseudo-code representation of the flattening process in accordance with the preferred embodiment.

For a better understanding of the details of some of the steps of FIG. 6 we now refer to FIGS. 7–9. Method 700 of FIG. 7 represents one specific example of a suitable recursive collection process used to place URLs into the URL container (step 670). Method 800 of FIG. 8 represents one specific example of processing the URLs in the URL container (step 680). Method 900 of FIG. 9 represents one specific example of the generation of a flattened web page (step 690).

Referring now to FIG. 7, method 700 is represented in recursive pseudo-code, and recursively stores in a URL container the selected URLs and the URLs related by a suitable relation criteria (e.g., digging or nesting levels). When the Collect URLs method 700 is invoked, the URL List, URL Container, and dig level must be specified. The URL list is the list of URLs that the user selected (e.g., in step 630 of FIG. 6). The URL container parameter specifies the name of the URL container being used. And the dig parameter specifies the digging or nesting level for relating URLs. For each URL in the URL List (step 710), the URL is added to the URL container (step 712). Once the URL is added to the URL container, the URL is used to invoke the corresponding web page (step 714), from which the related URLs are gathered (step 716). If the user-defined dig level for the selected URL is greater than zero (step 720), then for each URL collected it is necessary to recursively call (i.e., dig) into the nesting tree structure (step 724) to collect the other related URLs and place them in the URL container according to the relation criteria (i.e., digging level). This process is continued until all selected and all related URLs are collected and placed in the URL container. For example, if the selected URL has three links to other pages, and the user-defined dig level is three: first, the selected URL is added to the URL container as the first dig level; second, the selected URL is invoked to produce the URLs for the three linked web pages which are collected into the URL container as the second dig level; and third, the three linked pages are separately invoked to produce the URLs for their linked web pages to define the third dig level. These URLs are again collected and placed into the URL container to complete the processing of the URLs in the URL list.

Referring now to FIG. 8, method 800 is represented in pseudo-code that prepares the URLs for flattening into a conglomerate page. For each URL in the URL container (step 810) the web page corresponding to each URL is invoked (step 820). All URLs referenced within the invoked web pages are collected in preparation for processing (step 830). Next, each URL collected in step 830 is processed (step 840). If the URL references a URL within the URL container (step 842), the first occurrence of the URL is marked as the target using the NAME attribute (step 846), while all subsequent occurrences of the URL are cross-referenced back to the target reference by modification of the HREF tags to include the text "See Section____" where "____" is the text specified in the target HREF (step 848). For example, for an anchor of the form <A NAME="X"> Chapter X</A> where Chapter X is included in the URL container, the description inserted into the text would be "See Chapter X". If the URL references a URL not within the URL container, the associated HREF attribute is modified to include the text "Section Not Included" (step 850). This process is continued until all URLs in the URL container have been identified as a target, a cross-reference or identified as being "Not Included."

Referring now to FIG. 9, method 900 is represented in pseudo-code that processes the modified URL container at the conclusion of method 800 (FIG. 8) to generate the flattened or conglomerate web page. For each URL in the URL container (step 910), each URL is invoked to produce the associated web page (step 920). Next, the URLs referenced in the page are collected (step 930). For each URL collected (step 940), if the HREF statement includes an EMBED attribute (step 942), portions of the page specified in the HREF statement that includes the EMBED attribute are inserted into the page (step 944). The new page is then added to the flattened page file, by preferably appending the page to the end of the flattened page file (step 950). The EMBED attribute and other new attributes defined by the present invention are discussed in more detail below.

At a basic level, a web page is made up of various fields of information separated by special delimiters known as "tags". Tags tell the web browser what to do with the information in a particular field. For example, tags may cause the web browser to display an image, to display text, to play an audio message, or to display text in a special field known as a hypertext link. A hypertext link is a referencing mechanism for identifying remote resources located anywhere within the virtual memory space of the system, whether it be on the same computer, a secondary storage device, or a remote computer over a network. In other words, a link identifies the address (e.g., URL) which the computer should invoke when the link is selected by a user, typically by clicking on the link with a mouse or other pointing device. A hypertext link is defined in HTML using "anchor" tags. The tag that defines the beginning of the anchor is <A> and the tag that defines the end of the anchor is </A>. Anchors may include attributes such as HREF and NAME. The HREF attribute specifies the hypertext reference (e.g., URL) for the link. The NAME attribute places a marker in a page that can be used by a link to specify a particular location or section in the page. Specifying a name tells the browser where to begin displaying data. For example, NAME="X" marks a page with text X to name a section of the HTML page. The present invention defines an additional attribute that defines the end of a named field or section. The end attribute is similar, but reads NAME= "X.end", thereby ending a section. It is important to note that a browser will simply ignore any tags or attributes that it doesn't recognize. This feature allows a web page designer to add special tags or attributes that a particular browser may be able to recognize and process (such as NAME="X.end"), while assuring that the same page will be displayed without problem on existing browsers.

Another way of formatting HTML sections is to assume that the section runs from one NAME attribute to a NAME attribute that, at some point in the page, defines a new section. For example, a table of contents may include the following URLs:

myUrl#a
myUrl#b
myUrl#c
myUrl#d

The page myUrl may include the following sections:

<A NAME=a></A>(HTML data)
<A NAME=a0></A>(HTML data)
<A NAME=an></A>(HTML data)
<A NAME=b></A>(HTML data)
<A NAME=b0></A>(HTML data)
<A NAME=bn></A>(HTML data)
<A NAME=c><A>(HTML data)
<A NAME=d></A>(HTML data)
<A NAME=d0></A>(HTML data)
<A NAME=dn></A>(HTML data)

Assuming that an entire document will be printed by the various entries in a table of contents, if section b is referenced, we can assume that we need all HTML from the <A NAME=b></A>tag to the <A NAME=c></A>tag. Note that t he end of the section may be defined by the very next tag encountered, or, as in the example above, by a tag with a different label, causing sections b0 and bn to be included in the reference to section b, while section c is identified as a different section. In this manner the X.end attribute defined above is not needed if it is safe to make certain assumptions about the end points of HTML sections.

Another attribute defined by the present invention is an EMBED attribute. In the preferred embodiment, another attribute EMBEDSRC is a specific example of a specialpurpose EMBED attribute. For the purpose of illustrating the concepts of the present invention, the EMBED attribute is used to embed ordinary text in an HTML page marked off between a NAME="X" attribute and a NAME="X.end" attribute or between a NAME="X" attribute and a following NAME attribute that defines the beginning of a following section (thereby defining the end of the previous section). The EMBEDSRC attribute is used to embed text that represents a portion of a source code listing. Having source code embedded with different visual characteristics allows a programmer to display source code in a special format (e.g., color, font, font size, etc.) in a page of documentation for a computer program. These attributes are placed within an HREF statement. For example, the HREF statement to embed source code may read <A HREF="mysource.java#method" EMBEDSRC>See method</A> while the HREF to embed an HTML section reads <A HREF="mysource.html#section" EMBED>See method</A>. These new attributes identify the embedding location where the linked information may be inserted during formatting of the web page, described in method 900 and FIG. 9.

Other new anchor attributes defined by the present invention are FOLLOW, SHOULDFOLLOW and NOFOLLOW. These are again placed in the HREF statement to indicate whether a link must be, should be or must not be followed, respectively. The following is an example of one possible use of the FOLLOW attribute:

<A HREF="mysource.html#section" FOLLOW>See method</A>. A URL with a FOLLOW attribute is included if the referenced URL contains information (such as critical information) that should be included in the conglomerate web page even if the nesting level would dictate otherwise. A NOFOLLOW attribute does the opposite, not including the referenced URL even if the nesting level would have included it. A SHOULDFOLLOW attribute is also provided that includes the referenced material into the conglomerate web page if the relation criteria indicates to follow the links marked with the SHOULDFOLLOW attribute. The SHOULDFOLLOW and NOFOLLOW attributes are used in an HREF statement in the same manner as the FOLLOW attribute. It should be noted that additional tags or attributes may be created to do other operations like compressing or expanding data, reformatting data to another sources type or other operations known by one skilled in the art.

How these attributes are processed depends on the relation criteria specified by the user. For example, the user may specify to strictly adhere to the nesting level, ignoring any FOLLOW, SHOULDFOLLOW, or NOFOLLOW attributes encountered. In the alternative, the user may specify a relation criteria that includes all URLs that have the FOLLOW attribute, excludes those that have a NOFOLLOW attribute, and excludes those that have a SHOULDFOLLOW attribute. In yet another alternative, URLs with a FOLLOW or SHOULDFOLLOW attribute are included in the conglomerate web page while the URLs that have the NOFOLLOW attribute are expressly excluded. The attributes provided by the present invention allow a user to specify a more sophisticated relation criteria that may be more easily tailored to meet certain needs. Note that all of the new attributes defined herein are collectively referred to as "embedding attributes."

For method 900 of FIG. 9, each related web page is scanned to determine where the new attributes discussed above are located, i.e., EMBED, EMBEDSRC, NAME="X.end", FOLLOW, SHOULDFOLLOW, NOFOLLOW, etc. (steps 940 and 942). All the NAME tags that specify the end of a named section are located to identify sections of data. Once the sections of data have been specified, any EMBED and EMBEDSRC tags are located, and the corresponding associated sections are inserted into the corresponding related web page at the corresponding EMBED or EMBEDSRC locations (step 944). This process is continued until all the URLs in the URL container that have the EMBED or EMBEDSRC attribute have been inserted into the conglomerate page. All the selected pages are collected and placed into the new conglomerate page to complete the web page formatting process.

It should be noted that the preferred embodiment of the web page formatting mechanism 128 uses HTML tags to identify sections and insertion points. However, one skilled in the art will recognize that the same operations may be performed using other languages and systems, for example Java and JavaScript.

The HTML attributes discussed above, in the preferred embodiment of the invention, are already contained within the codes of the selected and related web pages. However, a method in accordance with the present invention allows a user to insert the above-discussed attributes into an existing web page either manually or dynamically to allow all existing web pages to be used in the formatting process of the present invention. This method is preferably an interactive process where the HTML of existing pages is scanned for HREF statements, and the user is given the opportunity to insert any of the newly-defined attributes above (or other attributes or tags) as appropriate. A tool for performing this conversion of existing HTML allows a user to quickly convert pages to a format in accordance with the present invention that allows formatting mechanism 128 to process these pages as if they were originally developed using the attributes defined herein.

While the invention has been particularly shown and described with reference to preferred exemplary embodiments thereof, it will be understood by those skilled in the art that various changes in form and details may be made therein without departing from the spirit and scope of the invention. For example, while the preferred embodiments herein are discussed in terms of HTML pages, other page formats and data formats are equally encompassed by the present invention. The term page as used herein is intended to encompass any quantum of data that may be processed or displayed. In addition, while the invention is shown for exemplary purposes with regard to web clients and web servers that communicate over the Internet, the present invention applies to any type of client/server scenario on any suitable network. Furthermore, the use of URLs to collect and format a number of pages into a single web page is only one method of collecting the desired data within the scope of the present invention. Also, the description herein refers to a "user" that may perform certain functions. The term "user" as used in the specification and claims herein expressly includes any agent that may perform the functions of a user, including without limitation human users, computer functions, and software programs in any form.

What is claimed is:

1. An apparatus comprising:
   at least one processor;
   a memory coupled to the at least one processor; and
   a web page formatting mechanism residing in the memory and executed by the at least one processor, the web page formatting mechanism identifying from at least one selected web page a plurality of links on the at least one selected web page that each reference a web page, the formatting mechanism identifying from the identified links at least one web page that is related to the at least one selected page, the formatting mechanism generating a conglomerate web page from the at least one selected web page and the at least one related web page.

2. The apparatus of claim 1 wherein the formatting mechanism comprises:
   a mechanism for selecting at least one web page;
   a mechanism for storing the at least one selected web page and at least one related web page; and
   a mechanism that generates the conglomerate web page from the stored web pages.

3. The apparatus of claim 2 wherein the mechanism for selecting the at least one web page comprises a mechanism that determines from a user the selected at least one web page and at least one relation criteria for relating at least one of the related web pages to the at least one selected web pages.

4. The apparatus of claim 2 wherein the mechanism for storing the at least one selected web page and the at least one related web page comprises a mechanism for determining from the at least one selected web page the at least one related web page.

5. The apparatus of claim 2 wherein the mechanism that generates the conglomerate page comprises:
   a mechanism that invokes the at least one selected web page and the plurality of related web pages searching for at least one embedding code; and
   an embedding mechanism for embedding a portion of a referenced web page into a portion of the conglomerate web page according to the embedding code.

6. The apparatus of claim 5 wherein the embedded portion comprises source code.

7. The apparatus of claim 5 wherein the embedded portion comprises an HTML section.

8. The apparatus of claim 1 wherein the selected web pages are selected using a Uniform Resource Locator (URL).

9. The apparatus of claim 1 wherein the selected web page is a hypertext markup language (HTML) page.

10. The apparatus of claim 1 wherein two web pages are related if either of the two web pages are within a predetermined nesting level with respect to the other web page.

11. The apparatus of claim 1 wherein two web pages are related if either of the two web pages have a link to the other.

12. The apparatus of claim 1 wherein two web pages are related if the two pages reside on the same server.

13. The apparatus of claim 1 wherein two web pages are related if the two web pages have the same base address.

14. The apparatus of claim 1 further comprising a mechanism for printing the conglomerate web page.

15. An apparatus comprising:
   at least one processor;
   a memory coupled to the at least one processor;
   a plurality of web pages residing in the memory; and
   a web page formatting mechanism residing in the memory and executed by the at least one processor, the web page formatting mechanism comprising:
   a mechanism for selecting at least one web page from the plurality of web pages;
   a mechanism for identifying from the at least one selected web page a plurality of links on the at least one selected web page that each reference a web page;
   a mechanism for identifying from the identified links at least one web page that is related to the at least one selected page;
   a mechanism for storing the at least one selected web page and the at least one related web page; and
   a mechanism that generates a conglomerate web page from the stored web pages.

16. The apparatus of claim 15 wherein at least one of the plurality of web pages includes at least one embedding attribute.

17. The apparatus of claim 16 wherein the at least one embedding attribute comprises at least one attribute that at least partially determines whether or not a link to another of the plurality of web pages is followed.

18. The apparatus of claim 15 wherein at least one of the plurality of web pages includes at least one attribute that defines the end of at least one section of the at least one web page.

19. A program product comprising:
   (A) a web page formatting mechanism, the web page formatting mechanism identifying from at least one selected web page a plurality of links on the at least one selected web page that each reference a web page, the formatting mechanism identifying from the identified links at least one web page that is related to the at least one selected page, the formatting mechanism generating a conglomerate web page from the at least one selected page and the at least one related web page; and
   (B) signal bearing media bearing the web page formatting mechanism.

20. The program product of claim 19 wherein the signal bearing media comprises recordable media.

21. The program product of claim 19 wherein the signal bearing media comprises transmission media.

22. The program product of claim 19 wherein two web pages are related if either of the two web pages have a link to the other.

23. The program product of claim 19 wherein two web pages are related if the two web pages reside on the same server.

24. The program product of claim 19 wherein two web pages are related if the two web pages have the same base address.

25. A program product comprising:
   (A) a web page formatting mechanism, the web page formatting mechanism including:
      a mechanism for selecting at least one web page;
      a mechanism for identifying from the at least one selected web page a plurality of links on the at least one selected web page that each reference a web page;
      a mechanism for identifying from the identified links at least one web page that is related to the at least one selected page;
      a mechanism for storing the at least one selected web page and the at least one related page; and
      a mechanism that generates a conglomerate web page from the stored web pages;
   (B) signal bearing media bearing the web page formatting mechanism.

26. The program product of claim 25 wherein the signal bearing media comprises recordable media.

27. The program product of claim 25 wherein the signal bearing media comprises transmission media.

28. The program product of claim 25 wherein the web page formatting mechanism further comprises a mechanism for printing the conglomerate page.

29. The program product of claim 25 wherein the selected web page is selected using.

30. The program product of claim 25 wherein the selected web page is a hypertext markup language (HTML) page.

31. A method for formatting a number of related web pages into a conglomerate web page, the method including the steps of:
   (A) selecting at least one web page and at least one relation criterion for the at least one web page;
   (B) identifying from the at least one selected web page a plurality of links on the at least one selected web page that each reference a web page;
   (C) identifying from the identified links and the at least one relation criterion at least one web page that is related to the at least one selected page;
   (D) storing the at least one selected web page and the at least one related web page; and
   (E) generating the conglomerate web page from the stored web pages.

32. A method for reformatting an existing web page, the method including the steps of:
   determining from the existing web page at least one reference in the existing web page to data to incorporate into the existing web page;
   modifying the existing web page by inserting at least one embedding code into the existing web page that identifies the location of the data in the existing web page and that identifies the data to be incorporated into the existing web page.

33. The method of claim 32 wherein the at least one reference in the existing web page comprises a URL.

34. The method of claim 32 wherein the data to be incorporated into the existing web page comprises MIME data.

35. A method for formatting and printing a number of related web pages as a single document, the method including the steps of:
   selecting at least one URL corresponding to at least one selected web page;
   selecting a relation criteria for each selected URL;
   recursively collecting all related URLs for each selected URL according to the corresponding relation criteria;
   invoking the at least one selected web page and the related web pages corresponding to the related URLs;
   storing the at least one selected web page and the related web pages in the single document, the at least one selected web page and the related web pages including at least one embedding attribute specifying at least on portion of at least one referenced web page to be embedded;
   inserting the at least one portion of the at least one referenced web page specified by the at least one embedding code into the single document at the corresponding web page; and
   printing the single document.

36. The method of claim 35 wherein the at least one embedding attribute comprises at least one attribute that at least partially determines whether or not a link to another of the plurality of pages is followed.

37. The method of claim 35 wherein the at least one embedding attribute defines the end of at least one section of the at least one page.

* * * * *